Figure 1:
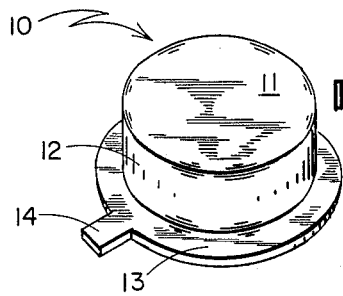

March 8, 1966  J. R. HENDERSON  3,239,596
SUPPORT FOR ELECTRICAL ELEMENTS HAVING SEPARATE CONDUCTIVE
SEGMENTS FOR CONNECTING THE ELEMENTS TO SUPPORT LEADS
Filed Feb. 25, 1963  3 Sheets-Sheet 1

JOHN R. HENDERSON
INVENTOR.

BY
David M. Keay
AGENT.

March 8, 1966  J. R. HENDERSON  3,239,596
SUPPORT FOR ELECTRICAL ELEMENTS HAVING SEPARATE CONDUCTIVE
SEGMENTS FOR CONNECTING THE ELEMENTS TO SUPPORT LEADS
Filed Feb. 25, 1963  3 Sheets-Sheet 2

JOHN R. HENDERSON
INVENTOR.

BY David M. Keay
AGENT.

March 8, 1966   J. R. HENDERSON   3,239,596
SUPPORT FOR ELECTRICAL ELEMENTS HAVING SEPARATE CONDUCTIVE
SEGMENTS FOR CONNECTING THE ELEMENTS TO SUPPORT LEADS
Filed Feb. 25, 1963   3 Sheets-Sheet 3
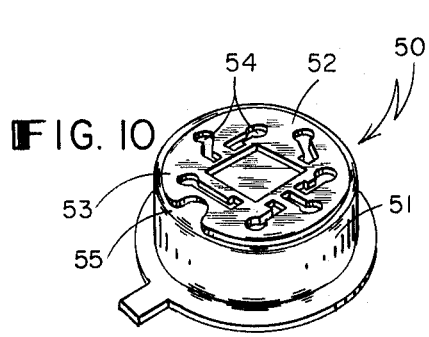
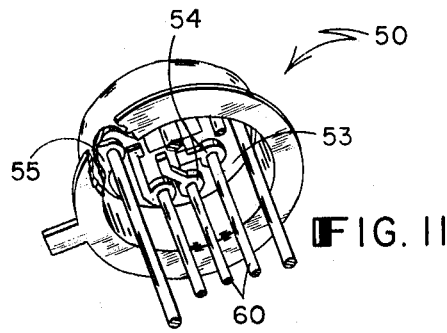
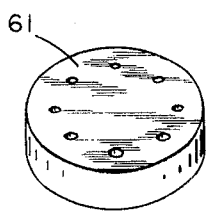
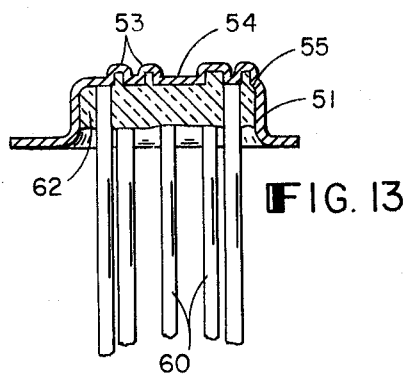
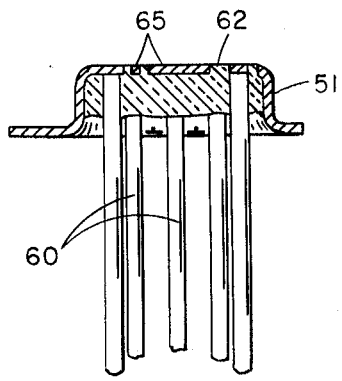
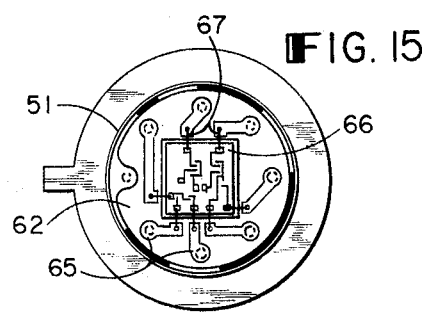
JOHN R. HENDERSON
INVENTOR.
BY David M. Keay
AGENT.

United States Patent Office 3,239,596
Patented Mar. 8, 1966

3,239,596
SUPPORT FOR ELECTRICAL ELEMENTS HAVING SEPARATE CONDUCTIVE SEGMENTS FOR CONNECTING THE ELEMENTS TO SUPPORT LEADS
John R. Henderson, Winchester, Mass., assignor to Sylvania Electric Products Inc., a corporation of Delaware
Filed Feb. 25, 1963, Ser. No. 260,760
5 Claims. (Cl. 174—52)

This invention relates to supports or mountings for electrical elements. More particularly, it is concerned with a type of support constituting one part of a two-part enclosure within which small electrical elements are mounted. Conductive leads providing electrical connections to the electrodes of the elements pass through the support to the exterior of the enclosure and are hermetically sealed in insulating relation to the support.

A typical enclosure for the electrical elements of semiconductor devices and so-called integrated circuits is a two-part container. The container includes a base section or support upon which the semiconductor element or elements are mounted. A plurality of wire leads pass completely through the support to provide electrical connections for the elements mounted on the support. Each of the leads is suitably insulated from the others and hermetically sealed in the support. After the elements have been mounted on the support, contact wires are connected from the electrodes of the elements to the leads. A cover section is then sealed to the base section in order to provide a complete enclosure which surrounds the elements, while permitting electrical connections to be made thereto.

One form of support, also called a stem, or header, is fabricated from a dish-shaped metal stamping or eyelet which serves as the principal member of the support. A layer of a suitable insulating material, usually glass, is sealed within the dish-shaped member. Conductive leads pass through the layer of glass and through openings in the metal member so as to be insulated from the member and from each other. The leads are heretically sealed to the glass layer along the portions of their length encircled by the glass. The dish-shaped member has an outwardly turned rim at its periphery to which the cover section is sealed as by welding after the electrical elements have been mounted on the support and appropriately connected to the leads.

Presently known production techniques are employed in producing electrical elements which are very small in volume. For example, many components and their electrical connections can be fabricated in a single wafer of semiconductor material so as to produce a complete "integrated circuit." The wafer is usually mounted in an enclosure and electrical connections provided from the electrodes of the electrical elements to the exterior of the enclosure. A container or enclosure of the type described hereinabove for protecting the electrical elements and providing electrical leads thereto occupies a large volume relative to that of the elements themselves.

In attempting to fabricate enclosures of small size various problems have been encountered. The conductive leads are mechanically secured to the remainder of the support only by the glass-to-metal seal along the portion of each lead encircled by the glass layer. A certain thickness of glass layer, or, in other words, a certain amount of glass-to-metal seal area is necessary in order to insure a proper mechanical bond.

In addition, when an enclosure is employed for supporting an integrated circuit, the number of external leads required may be fairly substantial. Eight, ten, or more leads are frequently needed in contrast to the three leads ordinarily used in making contact to the electrodes of a semiconductor transistor. The mechanical strength of the support is reduced when many closely spaced leads are secured only by glass-to-metal seals along short portions of their length.

Inside the container each of the leads must be connected as by a fine contact wire to an appropriate electrode of the electrical elements. The result is a confusing network of wires of varying lengths which pass from point to point within the enclosure with consequent danger of the wires shorting to each other and to the cover section. There is also the possibility that contact wires of appreciable length may break under conditions of severe mechanical shock. Additionally, if the electrical elements are to be operated at high frequencies, an indiscriminate arrangement of contact wires within the enclosure may adversely affect the electrical characteristics of the elements.

It is an object of the present invention, therefore, to provide an improved support for electrical elements.

It is a more specific object of the invention to provide an improved support for electrical elements which is of rugged construction and which enables short, direct electrical contacts to be readily applied between the electrodes of the elements mounted on the support and the leads passing externally of the support.

It is another object of the invention to provide an improved method of fabricating a support for electrical elements.

Briefly, in accordance with the foregoing objects of the invention, a support is fabricated from a member of conductive material. A plurality of conductive lead wires are attached at appropriate locations to one surface of the member. A layer of insulating material is then sealed to the one surface of the member and to the portions of the leads adjacent the surface encircled by the layer. Portions of the member are then selectively removed so as to expose the underlying insulating material and provide a plurality of separate conductive segments adhering to the layer of insulating material and electrically insulated from each other. Each of the leads is connected to a different one of the resulting segments. The configuration and spacing of the segments are such that a location is provided for mounting a particular set of electrical elements on the support, and a conductive segment leading from each lead to a point adjacent the electrode of the electrical elements to which the lead is to be connected is also provided.

Figure 2:
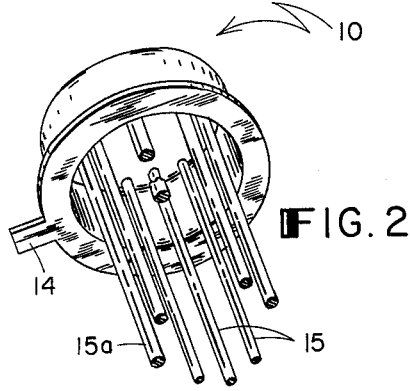
Figure 3:
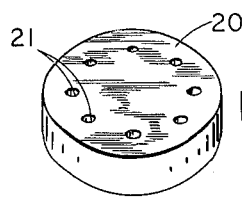
Figure 4:
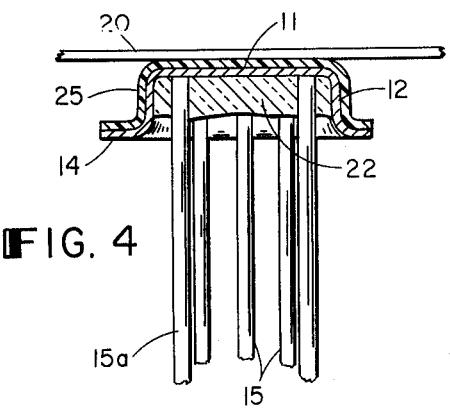

Additional features, objects and advantages of the invention will be apparent from the following detailed discussion and the accompanying drawings wherein:

FIG. 1 is a perspective view of a dish-shaped member employed in fabricating a support according to a first embodiment of the invention, FIG. 2 is a perspective view of the dish-shaped member with a plurality of wire leads attached at its inner surface, FIG. 3 is a perspective view of a preform of glass for sealing within the dish-shaped member, FIG. 4 is an elevational view in cross-section of the dish-shaped member with the leads and a preform of glass sealed thereto, illustrating a stage in the process of fabricating the support during which a layer of photo-resist material placed on the outer surface of the member is selectively exposed through a mask.

Figure 5:
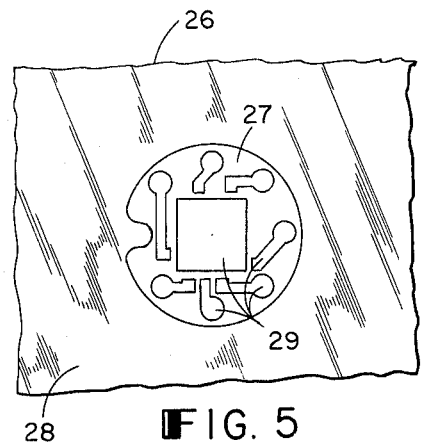
Figure 6:
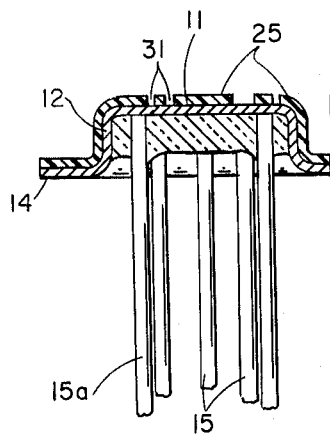
Figure 7:
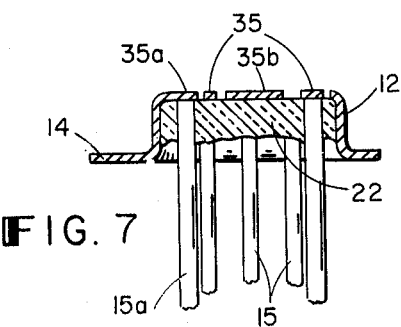
Figure 8:
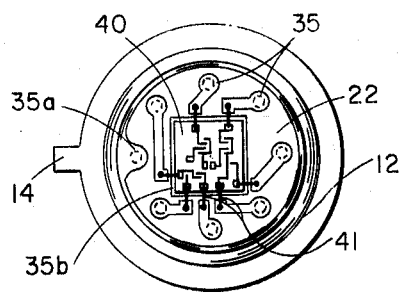
Figure 9:
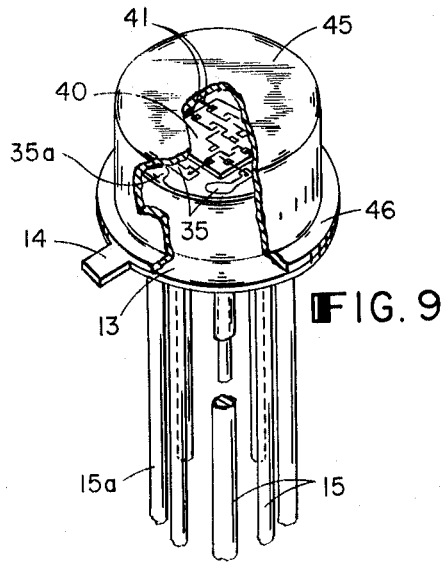

FIG. 5 is a plan view of the mask shown in FIG. 4 for selectively exposing the layer of photo-resist on the outer surface of the member, FIG. 6 is an elevational view in cross-section of the support subsequent to the removal of the portions of the layer of photo-resist selectively unexposed by virtue of the configuration of the mask, FIG. 7 illustrates in cross-section the completed support subsequent to the removal of the portions of the member not protected by the layer of photo-resist material as illustrated in FIG. 6, FIG. 8 shows in plan view the completed support of FIG. 7 with an integrated circuit fabricated in a single wafer of semiconductor material mounted thereon and with electrical connections completed between the circuit elements and the support leads, FIG. 9 is a fragmentary perspective view showing the support of FIG. 8 sealed to a cover section to provide a hermetically sealed enclosure for the electrical elements mounted on the support, FIG. 10 is a perspective view of a dish-shaped member having outwardly projecting and inwardly extending areas at its outer surface for fabricating a support according to another embodiment of the invention, FIG. 11 is a perspective view of the dish-shaped member of FIG. 10 with a plurality of leads attached at its inner surface, FIG. 12 illustrates in perspective a glass preform for sealing within the dish-shaped member, FIG. 13 is an elevational view in cross-section of the dish-shaped member with the leads and preform of glass sealed thereto, FIG. 14 illustrates in cross-section the completed support subsequent to the removal of the outwardly projecting portions of the member, and FIG. 15 is a plan view of the completed support of FIG. 14 with an integrated circuit fabricated in a single wafer of semiconductor material mounted thereon.

The member 10 illustrated in FIG. 1 is a metal eyelet which may be produced as by stamping. It is generally cylindrical in shape having a substantially flat, planar outer surface in its central region 11, and a peripheral region 12 including an outwardly turned rim 13. A small locating or orienting tab 14 extends beyond the edge of the rim at one point. The metal is of a type capable of forming a good mechanical and hermetic seal with glass, for example, an alloy of iron, nickel and cobalt, known as Kovar.

In producing a support according to the invention, the ends of a plurality of straight wire leads 15 are attached as by butt welding to the inner surface of the member 10 as illustrated in FIG. 2. The leads extend away from the inner surface in a direction generally perpendicular to the surface. As shown the leads are spaced at equal intervals in a circular pattern, although any desired arrangement may be used. The orienting tab 14 serves as a reference point for designating each particular lead. For purposes of illustration eight leads are shown with the first lead 15a on the same diameter and adjacent the orienting tab. The leads may also be of a glass sealing alloy such as Kovar.

A preform 20 of suitable insulating material, such as a glass which seals properly to the metal of the member and leads, is shown in FIG. 3. The preform is cylindrical in shape and has a diameter which is slightly less than the inside diameter of the member. A plurality of openings 21 in the preform are in the same pattern as the leads attached to the member. The glass preform is placed within the dish-shaped member with the leads threaded into the openings. Then the glass is sealed by known techniques to the inner surface of the member and to the leads. As can be seen in FIG. 4 an adherent hermetic seal is formed between the flat upper major surface of the resulting layer of glass 22 and all portions of the inner surface of the central region 11, and between the edge surfaces of the layer of glass and portions of the peripheral region 12 of the member. The portions of the leads adjacent the inner surface of the central region which are encircled by the layer of glass are also hermetically sealed to the layer.

As illustrated in FIG. 4 the outer surface of the member is then coated with a layer of protective photo-resist material 25. (The thickness of the photo-resist coating is shown exaggerated in FIG. 4 and also in FIG. 6 for the sake of clarity.) A mask 26 is then placed over the member is proper registration with the member. The mask, which is shown in plan view in FIG. 5, delineates the portions of the dish-shaped member which are to be removed and those which are to remain, as will be apparent from the discussion hereinafter. The mask 26 is transparent except for an opaque area 27 which defines the portion of the member to be removed. The opaque area lies within a transparent area 28 which defines the peripheral region of the member which is not to be removed. A plurality of separate transparent areas 29 are each encircled by the opaque area 27. These transparent areas define the segments in the central region of the member which are not to be removed.

In FIG. 5, only a single pattern of a larger mask is shown as indicated by the broken edges. For purposes of clarity the invention is shown and described with reference to a single unit. However, it will be understood that the process is more efficiently carried out in multiple with a large number of supports positioned in a suitable jig and a mask having an equal number of individual patterns placed in registration with the supports.

With the mask in proper position over the member, the mask and member are subjected to ultra-violet light. The portion of the coating 25 underlying the transparent areas 28 and 29 of the mask are thus exposed while those underlying the opaque area 27 are not. The photo-resist material is then developed, and the unexposed portions are washed away. The support at this stage in the process is shown in FIG. 6. An opening 31 in the photo-resist 25 having the configuration of the opaque area 27 of the mask exposes portions of the outer surface of the central region of the member. A coating of a resistant material of the nature of that illustrated in FIG. 6 alternatively may be produced as by any of other known techniques rather than by the photo-resist process described above.

The outer surface of the member is then exposed to an etching solution which attacks the metal of the member but not the resistant coating 25. The support may be handled during exposure to the etching solution in any manner which shields the uncoated metal of the peripheral region of the member and the leads from the solution. The etching treatment is continued until all the metal underlying the opening in the resistant coating is removed exposing the underlying glass layer. The coating of resistant material is then dissolved from the completed support illustrated in FIG. 7.

As can be seen from the cross-sectional view of FIG. 7 and the plan view of FIG. 8, the completed support includes the peripheral region 12 of the dish-shaped member in the form of a peripheral member encircling the edge surfaces of the layer of glass and sealed at a portion of its inner surface to the edge surfaces of the layer of glass. The central region of the member constitutes a plurality of separate metallic segments 35 of configuration and spacing as determined by the mask, each sealed to the upper major surface of the glass layer at its inner surface. Each of the leads 15 is sealed to the glass layer along the portion of its length passing through the layer and each is attached to a different one of the segments. The total glass-to-metal seal area of each lead and segment combination is thus substantial, providing a rugged mechanical bond. In the particular pattern of segments and leads shown, one of the leads 15a is attached to a segment 35a making contact to the peripheral region of the member, and a large central segment 35b is not connected to any of the leads.

A semiconductor wafer 40 in which is fabricated an integrated circuit of several electrical elements is shown mounted is position on the support of FIG. 8. The support is first cleaned and then a suitable metal, usually gold, is electroplated to the large central segment 35b and to the other segments 35 not connected to the peripheral region. It is an advantage of the present method of producing supports that any particular segments can be electro-plated while any can be left unplated as desired. In particular, the peripheral region 12 can be left unplated to provide a better welding surface for purposes which will be explained hereinbelow. The wafer 40 is attached as by brazing to the large central segment 35b which is of a suitable configuration to receive the wafer.

The other segments are of such configuration and spacing that the distance between a segment and the electrode of the electrical elements to which it is to make contact is as short as possible. Fine contact wires 41 of very short length are connected between the electrodes on the semiconductor wafer and the outer surface of the appropriate adjacent segments. The contact wires are attached as by known thermal compression bonding techniques. As can be seen in FIG. 8 the contact wires is readily form a neat uncluttered arrangement which is readily reproducible from unit to unit regardless of whether the bonds are accomplished by automatic sequipment or by manual operations.

After the semiconductor wafer has been mounted on the support and the electrodes connected to the segments, a cover section 45 of the two-part enclosure is sealed in place. As shown in the fragmentary view of FIG. 9 the cup-shaped cover section fits over the support so as to provide an enclosed chamber. An outwardly flaring rim 46 on the cover mates with the outwardly turned rim 13 of the support. The rim portions of the supporting cover are hermetically sealed as by known welding techniques. A completely hermetically sealed enclosure within which the electrical elements are contained is thus provided. Electrical contact to the electrodes of the elements is achieved by way of the segments and the wire leads leading to the exterior of the enclosure and sealed thereto in insulating relation to each other.

Another embodiment of the invention is illustrated at various stages of its production in FIGS. 10 through 15. A dish-shaped metal member 50 as illustrated in FIG. 10 has a peripheral region 51 and a central region 52. As the member is formed by stamping, it is embossed to produce in the central region a pattern of an outwardly projecting portion 53 encircling a plurality of inwardly extending portions 54. The outwardly projecting portion 53 is encircled by another inwardly extending portion 55 at the peripheral region of the member.

For illustrative purposes and ease of understanding, the pattern is the same as that shown and described in the first embodiment of the invention. That is, the outwardly projecting portion 53 corresponds to the opaque area 27 of the mask of FIG. 5, and the inwardly extending portions 54 and 55 correspond to the transparent areas 29 and 28 of the mask. The outwardly projecting portion lies above the level of the inwardly extending portions a distance which is slightly greater than the thickness of the metal in the central region. The metal in the central region is of generally uniform thickness.

As illustrated in FIG. 11 a plurality of wire leads 60 are attached at their end portions to the inner surface areas of the inwardly extending portions 54 of the dish-shaped member.

Glass is then sealed within the dish-shaped member. The glass may be supplied to the member as a preform 61 as shown in FIG. 12 in any other suitable manner. As can be seen from the cross-sectional view of FIG. 13 the glass forms a layer 62 which seals to the inner surfaces of the member and to the adjacent portions of the leads. The glass extends into the outwardly projecting portion and seals to all portions of the inner surface in the central region.

Next, those portions of the metal member and the glass layer which extend beyond the outer surfaces of the inwardly extending portions are removed as by grinding. Grinding is accomplished so as to produce a planar outer surface of metal and glass as illustrated in the cross-sectional view of FIG. 14. The projecting portion at the outer surface of the member has been completely removed as by grinding together with that portion of the glass layer adherent to the inner surface of the projecting portion.

The resulting support includes a plurality of metal segments 65 which are recessed in a glass layer 62 and a peripheral member 51 which encircles and is sealed to the edge surfaces of the glass layer. Each of the wire leads 60 is connected to one of the segments. The configuration and spacing of the segments, which can be seen from the plan view of FIG. 15, is determined by the pattern embossed in the member at the time it is fabricated. The pattern chosen is such as to accommodate the particular set of electrical elements which are to be mounted on the support.

As shown in FIG. 15 an integrated circuit fabricated in a single wafer 66 of semiconductor material is mounted on the support and contact wires 67 are connected between the electrodes of the electrical elements and the appropriate segments 65. As described above in reference to FIG. 9, a suitable cover section may then be sealed to the support at the outwardly turned rim of the peripheral region 51 to provide a complete enclosure for the elements mounted on the support.

What is claimed is:
1. A support for mounting electrical elements thereon comprising
   a layer of insulating material having edge surfaces and a major surface,
   a peripheral member of conductive material encircling the edge surfaces of said layer and directly adherent thereto,
   a plurality of separate conductive segments each having an inner surface directly adherent to the layer of insulating material at said major surface thereof, and
   lead wires extending through and directly adherent to said layer of insulating material, each contacting a separate segment at the inner surface thereof and terminating at said inner surface flush with said major surface of the layer of insulating material.

2. A support for mounting electrical elements thereon comprising
   a layer of glass having edge surfaces and a major surface,
   a peripheral member of conductive material having an outwardly turned rim,
   said peripheral member encircling the edge surfaces of said layer of glass and directly adherent thereto,
   a plurality of separate conductive segments each having an inner surface directly adherent to said major surface of the layer of glass, and
   a plurality of leads extending through and directly adherent to said layer of glass and making contact to the inner surfaces of said segments, each of said leads contacting a different one of said segments and terminating at said inner surface thereof flush with said major surface of the layer of glass,
   the surface of each of said segments opposite said inner surface being adapted to provide an electrical connection for an electrical element mounted on the support, and
   the outwardly turned rim of the peripheral member being adapted to form a hermetic seal with a cover section, so as to provide a sealed enclosure surrounding said segments and the electrical element.

3. A support for mounting electrical elements thereon comprising
   a layer of glass having edge surfaces and a major surface,
   a peripheral member of conductive material encircling the edge surfaces of said layer and directly adherent thereto,
   a plurality of separate conductive segments recessed in the layer of glass,
   said segments having inner surfaces directly adherent to said major surface of the layer of glass and outer surfaces lying in a plane common with the exposed areas of said major surface of the layer of glass, and a plurality of leads extending through and directly adherent to said layer of glass, each lead terminating at said inner surface of a different one of said segments flush with said major surface of the layer of glass and being electrically and mechanically connected to the one of said segments.

4. In combination a support and an integrated circuit mounted thereon comprising a layer of insulating material having edge surfaces and a major surface, a peripheral member of conductive material encircling the edge surfaces of said layer and directly adherent thereto, a plurality of separate conductive segments each having an inner surface directly adherent to the layer of insulating material at said major surface thereof, lead wires extending through and directly adherent to said layer of insulating material, each contacting a separate segment at said inner surface thereof and terminating at said inner surface flush with said major surface of the layer of insulating material, a semiconductor wafer having an integrated circuit of several electrical elements fabricated therein mounted on one of said segments, and electrical connections between electrodes of the electrical elements and the remaining segments of said plurality of segments.

5. In combination a support and an integrated circuit mounted thereon comprising a layer of glass having edge surfaces and a major surface, a peripheral member of conductive material encircling the edge surfaces of said layer of glass and directly adherent thereto, a plurality of separate conductive segments each having an inner surface directly adherent to said major surface of the layer of glass, a plurality of leads extending through and directly adherent to said layer of glass and making contact to said inner surfaces of said segments, each of said leads contacting a different one of said segments and terminating at said inner surface thereof flush with said major surface of the layer of glass, a semiconductor wafer having an integrated circuit of several electrical elements fabricated therein mounted on one of said segments at the surface opposite said inner surface, each segment of the remaining segments of said plurality of segments having a portion thereof adjacent a different electrode of the electrical elements, and an electrical connection between said portion of each segment of the remaining segments of said plurality of segments and the adjacent electrode.

References Cited by the Examiner
UNITED STATES PATENTS

| | | | |
|---|---|---|---|
| 2,459,193 | 1/1949 | Sparks et al. | 174—50 |
| 2,479,872 | 8/1949 | Seiden | 174—50 |
| 2,871,549 | 2/1959 | Arnold | 29—155.5 |
| 2,925,645 | 2/1960 | Bell et al. | 29—155.5 |
| 2,934,588 | 4/1960 | Ronci | 317—234 X |
| 2,958,928 | 11/1960 | Bain et al. | 29—155.5 |
| 2,967,979 | 1/1961 | Plesser et al. | 174—68 X |
| 2,990,501 | 6/1961 | Cornielson et al. | 174—52 X |
| 3,052,822 | 9/1962 | Kilby | 317—101 |
| 3,061,760 | 10/1962 | Ezzo | 317—101 X |
| 3,083,320 | 3/1963 | Godfrey et al. | 317—234 |

OTHER REFERENCES

"Integrated Circuits," Electronic Design, Nov. 9, 1960, pp. 80–81.

Kirschner, J. G.: "Packaged Electronic Circuits," Electronics World, May 1960, p. 122.

JOHN F. BURNS, *Primary Examiner.*

JOHN P. WILDMAN, LARAMIE E. ASKIN, *Examiners.*